US009579947B2

(12) United States Patent
Kim et al.

(10) Patent No.: US 9,579,947 B2
(45) Date of Patent: Feb. 28, 2017

(54) COUPLED TORSION BEAM AXLE FOR VEHICLES

(71) Applicants: Hyundai Motor Company, Seoul (KR); Kia Motors Corporation, Seoul (KR); Dong Hee Industrial Co., Ltd., Ulsan (KR); Hwashin Co. Ltd., Yeongcheon-si (KR)

(72) Inventors: Sang Rak Kim, Seoul (KR); Jung Taek Lim, Gwangmyeong-si (KR); Soo Chul Lee, Ulsan (KR); Hak Il Kim, Bucheon-si (KR); Min Seok Kang, Ulsan (KR); Eui Keun Jeong, Gunpo-si (KR)

(73) Assignees: Hyundai Motor Company, Seoul (KR); Kia Motors Corporation, Seoul (KR); Dong Hee Industrial Co., Ltd., Ulsan (KR); Hwashin Co. Ltd., Yeongcheon-si (KR)

(*) Notice: Subject to any disclaimer, the term of this patent is extended or adjusted under 35 U.S.C. 154(b) by 0 days.

(21) Appl. No.: 14/948,300

(22) Filed: Nov. 21, 2015

(65) Prior Publication Data

US 2016/0325596 A1    Nov. 10, 2016

(30) Foreign Application Priority Data

May 6, 2015 (KR) .......................... 10-2015-0063351

(51) Int. Cl.
*B60G 21/05* (2006.01)

(52) U.S. Cl.
CPC ........ *B60G 21/051* (2013.01); *B60G 2200/23* (2013.01); *B60G 2206/20* (2013.01); *B60G 2206/8102* (2013.01)

(58) Field of Classification Search
CPC .... B60G 9/006; B60G 11/23; B60G 2200/21; B60G 2200/22; B60G 2200/23; B60G 2200/31
(Continued)

(56) References Cited

U.S. PATENT DOCUMENTS 5,324,073 A * 6/1994 Alatalo ............... B60G 21/051
                                                228/144
5,409,255 A * 4/1995 Alatalo ............... B60G 21/051
                                                228/144

(Continued)

FOREIGN PATENT DOCUMENTS

EP    2 098 391 A1    9/2009
JP    10-230723 A    9/1998
(Continued)

*Primary Examiner* — Toan To
(74) *Attorney, Agent, or Firm* — Morgan, Lewis & Bockius LLP

(57) ABSTRACT

A coupled torsion beam axle for vehicles may include a torsion beam disposed in a vehicle width direction and trailing arms disposed at both ends of the torsion beam in a length direction of a vehicle body, wherein the torsion beam has an opened cross section formed in a reverse "U" shape by press-forming one sheet member machined so that lengths of right and left sides are different from each other on the basis of a center, and cross section widths which are different from each other along vehicle width directions of both sides on the basis of the center between the trailing arms of both sides, and front and rear surfaces formed in a wave shape along the vehicle width directions of both sides on the basis of the center.

5 Claims, 7 Drawing Sheets

(58) Field of Classification Search
USPC .................................. 280/124.106, 124.128
See application file for complete search history.

(56) References Cited

U.S. PATENT DOCUMENTS

| | | | | |
|---|---|---|---|---|
| 5,507,518 | A * | 4/1996 | Nakahara | B60G 7/008 |
| | | | | 267/273 |
| 6,460,869 | B1 * | 10/2002 | Tremouilles | B60G 21/051 |
| | | | | 280/124.116 |
| 6,523,841 | B2 * | 2/2003 | Glaser | B60B 35/006 |
| | | | | 280/124.106 |
| 8,490,990 | B2 * | 7/2013 | Lepre | B21C 1/24 |
| | | | | 267/188 |
| 2009/0014975 | A1 * | 1/2009 | Lee | B60B 35/04 |
| | | | | 280/124.116 |
| 2010/0059959 | A1 * | 3/2010 | Kim | B60G 21/051 |
| | | | | 280/124.116 |
| 2011/0115183 | A1 * | 5/2011 | Alesso | B60G 21/051 |
| | | | | 280/124.106 |
| 2013/0214504 | A1 * | 8/2013 | Ohdo | B60G 21/051 |
| | | | | 280/124.106 |
| 2014/0159334 | A1 * | 6/2014 | Jang | B60G 21/051 |
| | | | | 280/124.166 |
| 2015/0123370 | A1 * | 5/2015 | Lee | B60G 21/052 |
| | | | | 280/124.128 |

FOREIGN PATENT DOCUMENTS

| | | |
|---|---|---|
| JP | 3196002 B2 | 8/2001 |
| JP | 3732617 B2 | 1/2006 |
| JP | 4282956 B2 | 6/2009 |
| JP | 2009-143538 A | 7/2009 |
| JP | 2009-255763 A | 11/2009 |
| JP | 2010-23838 A | 2/2010 |
| JP | 2014-97772 A | 5/2014 |
| WO | WO 2014/138850 A1 | 9/2014 |

* cited by examiner

COUPLED TORSION BEAM AXLE FOR VEHICLES

CROSS-REFERENCE TO RELATED APPLICATION

The present application claims priority to and the benefit of Korean Patent Application No. 10-2015-0063351 filed on May 6, 2015, the entire contents of which is incorporated herein for all purposes by this reference.

BACKGROUND OF THE INVENTION

Field of the Invention

The present invention relates to a coupled torsion beam axle for vehicles, and more particularly to, a coupled torsion beam axle for vehicles capable of securing roll rigidity of a torsion beam and alleviating a tuning fork vibration phenomenon occurred by a vertical bending of the torsion beam.

Description of Related Art

Since a coupled torsion beam axle (CTBA) for vehicles is generally configured of simple parts and has a low design performance region, but it exhibits relatively high driving stability despite low production cost and small weight, it has been applied to a rear suspension of a small car and a lower medium car.

A configuration of the coupled torsion beam axle (CTBA) has a torsion beam 1 provided in a vehicle width direction and trailing arms 3 each fixed to both ends of the torsion beam 1 in a length direction of a vehicle body by a welding.

Rear outer sides of the trailing arms 3 are each provided with spindle brackets 5, in which carries for mounting tires and wheels 7 are rotatably installed.

In addition, a tip end of each of the trailing arms 3 is provided with a mounting bush 9 for a connection with the vehicle body, and a rear inner side thereof is installed with a spring sheet 13 for mounting a suspension spring 11 of a suspension and a shock absorber mounter 17 for connecting a shock absorber 15.

As such, the torsion beam 1 applied to the coupled torsion beam axle according to the related art has a cross section having a reverse "V" shape taken along a length direction thereof.

However, in the torsion beam axle according to the related art according to the related art, since the torsion beam 1 has a predetermined cross section, roll rigidity of the torsion beam 1 may not be elastically maintained. As a result, the torsion beam axle exhibits not only behavior characteristics affecting adversely on ride comfort, but also has a problem that durability of a connection part between the torsion beam 1 and the trailing arm 3 is degraded by an influence of lateral force, longitudinal force, and braking force transferred through the trailing arm 3.

In addition, it is difficult for the torsion beam 1 to isolate vibration by a vertical bending. Therefore, there was a problem that when the vibration by the vertical bending occurs, a tuning fork vibration phenomenon occurs along both sides of the torsion beam 1 and noise by the vibration is transferred to an inside of the vehicle, thereby increasing noise of the vehicle body.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a coupled torsion beam axle for vehicles having advantages of distributing roll rigidity concentrated on both right and left ends of a torsion beam.

In addition, various aspects of the present invention are directed to providing a coupled torsion beam axle for vehicles having advantages of alleviating a tuning fork vibration phenomenon occurred by a vertical bending of a torsion beam.

An exemplary embodiment of the present invention provides a coupled torsion beam axle for vehicles including a torsion beam disposed in a vehicle width direction and trailing arms disposed at both ends of the torsion beam in a length direction of a vehicle body, wherein the torsion beam has an opened cross section formed in a reverse "U" shape by press-forming one sheet member machined so that lengths of right and left sides are different from each other on the basis of a center, and cross section widths which are different from each other along vehicle width directions of both sides on the basis of the center between the trailing arms of both sides, and front and rear surfaces formed in a wave shape along the vehicle width directions of both sides on the basis of the center.

The torsion beam may include a center part having a bent surface formed to be bent in a diagonal direction so that both sides of an upper end are symmetrical to each other at the center, and lower ends of both sides of the bent surface which are formed to be extended in a lower side direction; side parts extended in both sides on the basis of the center part, having a cross section width which is increased as compared to that of the center part, having both sides of an upper portion formed to be extended in a lower side, and a width of a lower portion which is increased as compared to that of the center part; and end parts extended in both sides on the basis of the side part, having a cross section width which is decreased as compared to that of the side part, having both sides of an upper portion formed to be extended in a lower side, and a width of a lower portion which is decreased as compared to that of the side part.

The lower portion of the side part may be formed to be longer than a lower portion of the center part.

The lower portion of the end part may be formed to be shorter than the lower portion of the side part.

A lower end of the side part may be provided with a flange of which both ends are formed to be bent.

A lower end of the end part may be provided with a flange of which both ends are formed to be bent.

According to an embodiment of the present invention, the torsion beam is configured so that the cross section widths of the torsion beam are different along the vehicle width directions of both sides on the basis of the center between the trailing arms of both sides, and the front and rear surfaces of the torsion beam forms the wave shape along the vehicle width directions of both sides on the basis of the center, thereby making possible to implement lightness by reducing an overall thickness of a material of the torsion beam.

In addition, the torsion beam is configured so that the front and rear surfaces thereof form the wave shape along the vehicle width directions of both sides on the basis of the center, thereby making it possible to secure roll rigidity together with durability of the torsion beam.

In addition, in the torsion beam, the lengths of the lower portions of the center part, the side part, and the end part, respectively, are formed to be different from each other, and the opened cross section of the reverse "U" shape having the flange formed at the lower end of each of the side part and the end part are configured, thereby making it possible to alleviate the tuning fork vibration phenomenon occurred by a vertical bending of the torsion beam.

The methods and apparatuses of the present invention have other features and advantages which will be apparent from or are set forth in more detail in the accompanying drawings, which are incorporated herein, and the following Detailed Description, which together serve to explain predetermined principles of the present invention.

Figure 1:
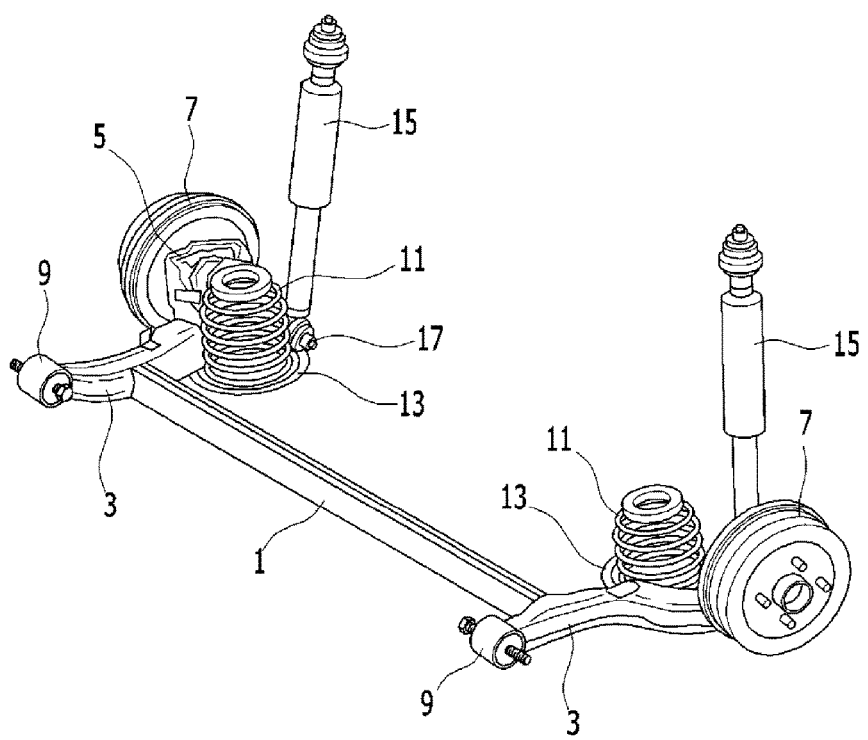
FIG. 1 is a perspective view of a rear suspension to which a general coupled torsion beam axle is applied.

It should be understood that the appended drawings are not necessarily to scale, presenting a somewhat simplified representation of various features illustrative of the basic principles of the invention. The predetermined design features of the present invention as disclosed herein, including, for example, predetermined dimensions, orientations, locations, and shapes will be determined in part by the particular intended application and use environment.

In the figures, reference numbers refer to a same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but further various alternatives, modifications, equivalents and other embodiments, which is/are included within the spirit and scope of the invention as defined by the appended claims.

Hereinafter, in the following detailed description, the present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

Since sizes and thicknesses of the respective components shown in the drawings are arbitrarily shown for the convenience of explanation, the present invention is not necessarily limited to those shown in the drawings and thicknesses of several layers and regions are exaggerated for clarity.

In addition, in the following detailed description, classifying names of the configurations into first, second, and the like, is to classify the configurations because the configurations have the same relationship, and the present invention is not necessarily limited to the above-mentioned order in the following detailed description.

Throughout the specification, unless explicitly described to the contrary, the word "comprise" and variations such as "comprises" or "comprising", will be understood to imply the inclusion of stated elements but not the exclusion of any other elements.

In addition, a term "unit", "means", "part", "member", or the like, described in the specification means a unit having a generic configuration of performing at least one function or operation.

Figure 2:
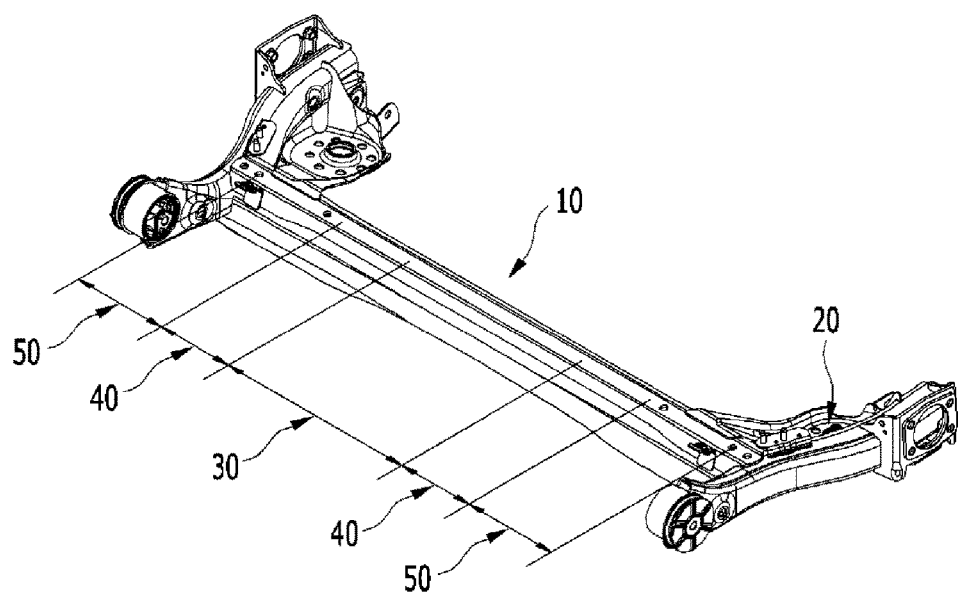
FIG. 2 is a perspective view of a coupled torsion beam axle for vehicles according to an exemplary embodiment of the present invention.
Figure 3:
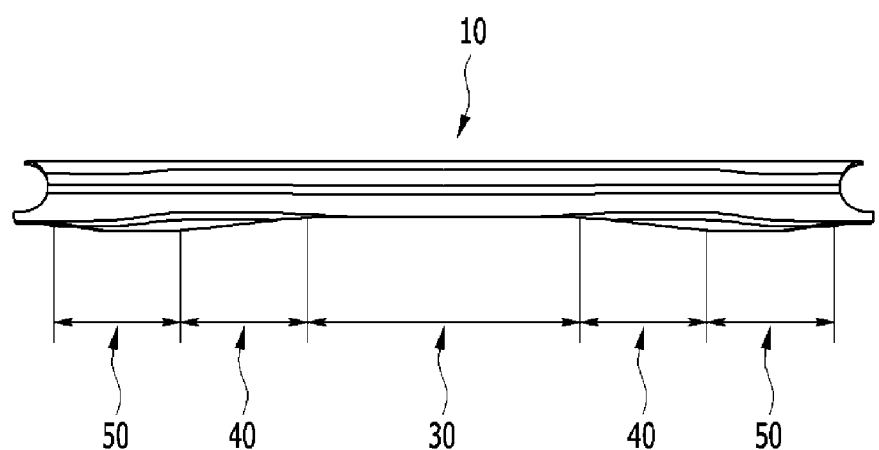
FIG. 3 is a plan view of a torsion beam of the coupled torsion beam axle for vehicles according to an exemplary embodiment of the present invention.

FIG. 2 is a perspective view of a coupled torsion beam axle for vehicles according to an exemplary embodiment of the present invention and FIG. 3 is a plan view of a torsion beam of the coupled torsion beam axle for vehicles according to an exemplary embodiment of the present invention.

First, referring to FIGS. 2 and 3, a coupled torsion beam axle for vehicles according to an exemplary embodiment of the present invention is configured to include a torsion beam 10 and trailing arms 20, wherein the torsion beam 10 is coupled to the trailing arms 20 disposed in a length direction of a vehicle body.

Here, the torsion beam 10, which is an apparatus preventing impact on a road occurring at the time of driving the vehicle from being transferred to the vehicle body or passengers, needs to be designed to be able to increase handling performance for grip force of the road at the time of the driving of the vehicle while improving ride comfort by alleviating the impact on the road.

The torsion beam 10 needs to be designed to be able to maintain uniform rigidity and continuous durability despite continuous impact on the road.

Since a continuous torsional load is acted on the torsion beam 10, the torsion beam 10 needs to have a stable durability design. Further, the torsion beam 10 performs an important role in durability depending on a cross section shape thereof.

For example, the cross section shape of the torsion beam 10 may be variously designed depending on characteristics of the vehicle, and may be determined in relation to roll rigidity and roll strength of the vehicle at the time of an initial design to be applied in various shapes.

Figure 4:
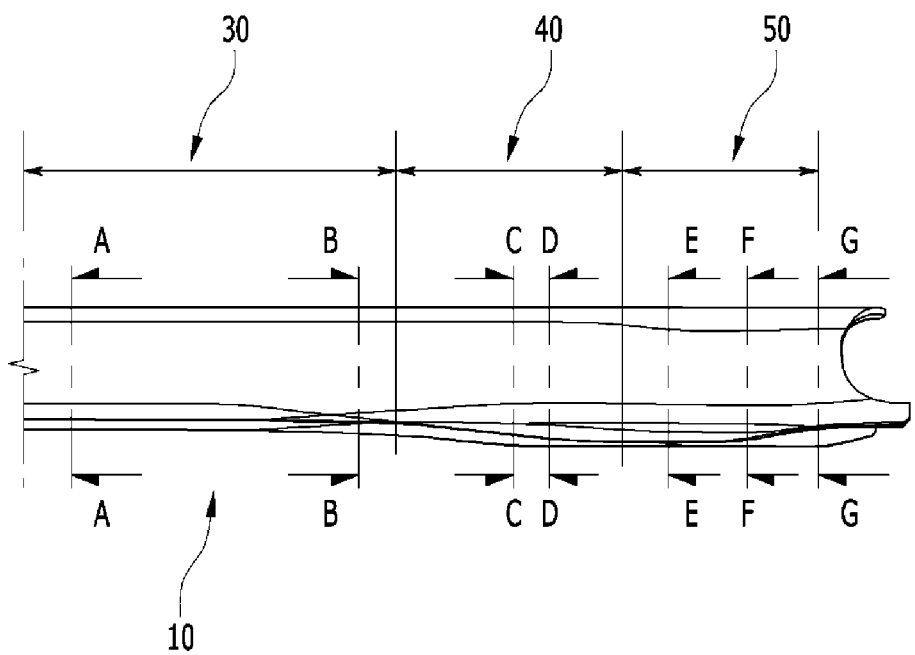
FIG. 4 is a partial plan view of the torsion beam of the coupled torsion beam axle for vehicles according to an exemplary embodiment of the present invention.
Figure 5:
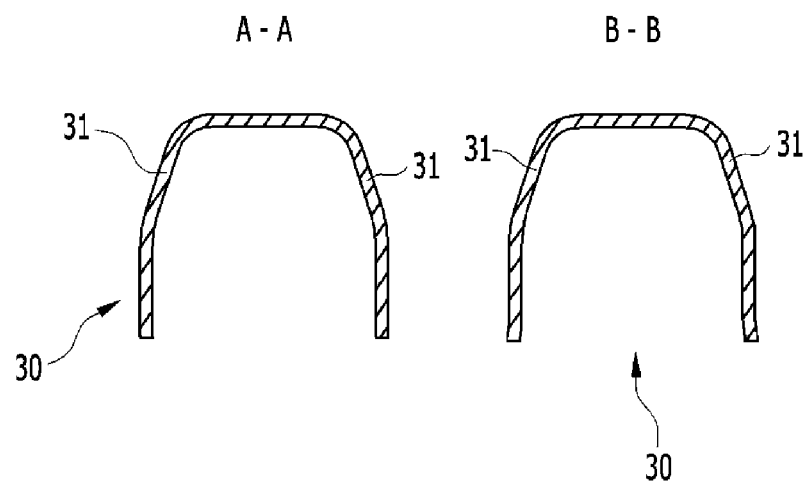
FIG. 5 is a cross-sectional view of a center part taken along lines A-A and B-B of FIG. 4.
Figure 6:
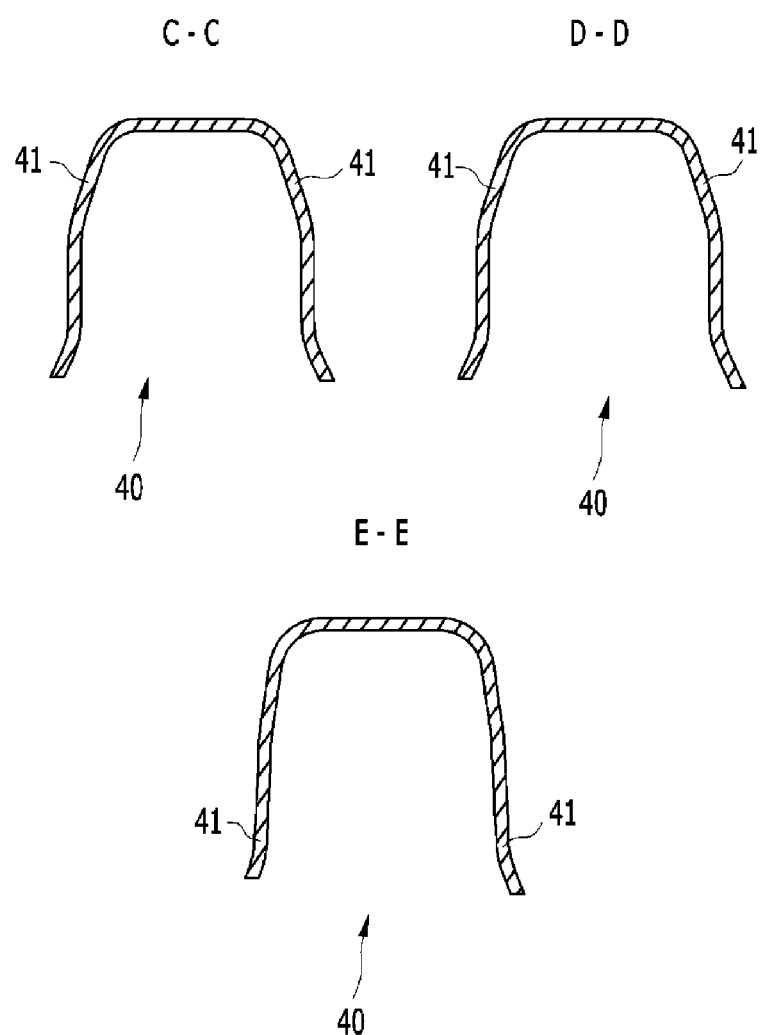
FIG. 6 is a cross-sectional view of a side part taken along lines C-C, D-D, and E-E of FIG. 4.
Figure 7:
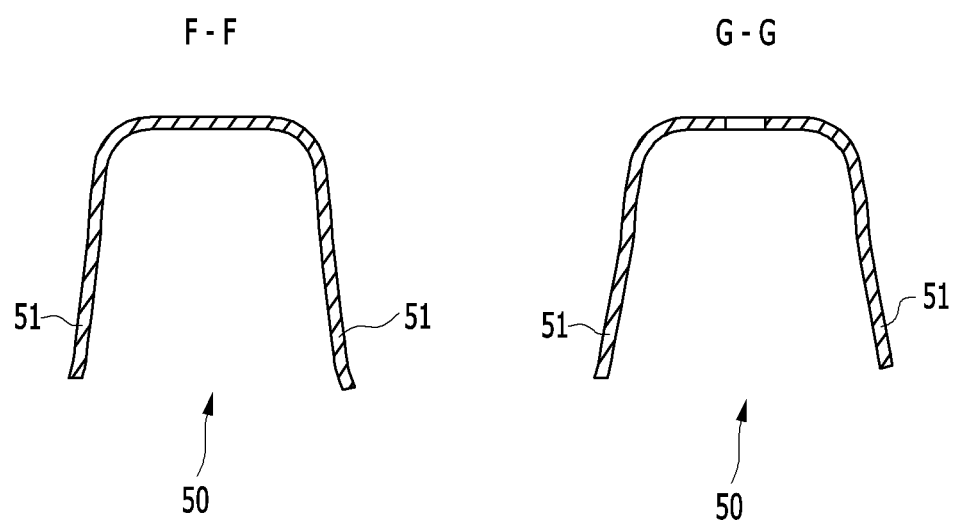
FIG. 7 is a cross-sectional view of an end part taken along lines F-F and G-G of FIG. 4.

FIG. 4 is a partial plan view of the torsion beam of the coupled torsion beam axle for vehicles according to an exemplary embodiment of the present invention, FIG. 5 is a cross-sectional view of a center part taken along lines A-A and B-B of FIG. 4, FIG. 6 is a cross-sectional view of a side part taken along lines C-C, D-D, and E-E of FIG. 4, and FIG. 7 is a cross-sectional view of an end part taken along lines F-F and G-G of FIG. 4.

Referring to FIGS. 4 to 7, the torsion beam 10 of the coupled torsion beam axle for vehicle according to the exemplary embodiment of the present invention is manufactured to have an opened cross section of a reverse "U" shape by press-forming one sheet member machined to have different right and left lengths on the basis of a center.

Here, the torsion beam 10 has cross section widths which are different from each other along vehicle width directions of both sides on the basis of the center between the trailing arms 20 of both sides, and front and rear surfaces forming a wave shape along the vehicle width directions of both sides on the basis of the center.

The torsion beam 10 includes a center part 30, side parts 40, and end parts 50.

The center part 30 includes a bent surface 31 which is bent in a diagonal direction so that both sides of an upper end are symmetrical with each other at the center of the torsion beam 10. Lower ends of both sides of the bent surface 31 are formed to be extended in a lower direction.

The side parts 40 are extended in both sides on the basis of the center part 30 and a cross section width thereof is increased as compared to that of the center part 30.

Both sides of an upper portion of the side part 40 are formed to be extended in a lower side thereof and a width of a lower portion of the side part 40 is increased as compared to that of the center part 30.

The end parts 50 are extended in both sides on the basis of the side part 40 and a cross section width thereof is decreased as compared to that of the side part 40.

Both sides of an upper portion of the end part 50 are formed to be extended in a lower side thereof and a width of a lower portion of the end part 50 is decreased as compared to that of the side part 40.

The lower portion of the side part 40 is formed to be longer than that of the center part 30, and flanges 41 are formed at both ends of the lower portion of the side part 40 to be bent.

A lower portion of the end part 40 is formed to be shorter than that of the side part 40, and flanges 51 are formed at both ends of the lower portion of the end part 50 to be bent.

The torsion beam 10 having the configuration as described above forms an opened cross section of a reverse "U" shape, and has a structure in which the cross section widths are different from each other along the vehicle width directions of both sides, and front and rear surfaces have a wave shape along the vehicle width directions of both sides on the basis of the center.

That is, since roll rigidity is determined depending on a shape and a direction of the cross section, the torsion beam 10 has a phenomenon in which roll rigidity is concentrated toward both right and left end sides rather than the center thereof.

Thus, according to the exemplary embodiment of the present invention, in order to secure roll rigidity of the torsion beam 10 while distributing roll rigidity concentrated on both right and left sides of the torsion beam 10, the torsion beam 10 has the cross section widths of the center part 30, the side part 40, and the end part 50 to be different from each other.

In addition, according to the exemplary embodiment of the present invention, in order to alleviate a tuning fork vibration phenomenon of the torsion beam 10, the lengths of the lower portions of the center part 30, the side part 40, and the end part 50, respectively, are formed to be different from each other, and the opened cross section of the reverse "U" shape having the flanges 41 and 51 formed at a lower end of each of the side part 40 and the end part 50 is configured.

That is, according to the exemplary embodiment of the present invention, when vibration occurs from the torsion beam 10, the vibration is attenuated while passing through the center part 30, the side part 40, the end part 50, and the flanges 41 and 51 having different lengths of the lower portions thereof, thereby making it possible to alleviate the tuning fork phenomenon of the torsion beam 10.

In the coupled torsion beam axle for vehicles according to the exemplary embodiment of the present invention as described above, the torsion beam 10 is configured so that the opened cross section of the reverse "U" shape is formed, the cross section widths of the torsion beam 10 are different along the vehicle width directions of both sides on the basis of the center between the trailing arms 20 of both sides, and the front and rear surfaces of the torsion beam 10 forms the wave shape along the vehicle width directions of both sides on the basis of the center, thereby making possible to implement lightness by reducing an overall thickness of a material of the torsion beam 10.

In addition, the torsion beam 10 is configured so that the front and rear surfaces thereof form the wave shape along the vehicle width directions of both sides on the basis of the center, thereby making it possible to secure roll rigidity together with durability of the torsion beam 10.

In addition, in the torsion beam 10, the lengths of the lower portions of the center part 30, the side part 40, and the end part 50, respectively, are formed to be different from each other, and the opened cross section of the reverse "U" shape having the flanges 41 and 51 formed at the lower end of each of the side part 40 and the end part 50 is configured, thereby making it possible to alleviate the tuning fork vibration phenomenon occurred by a vertical bending of the torsion beam 10.

For convenience in explanation and accurate definition in the appended claims, the terms "upper", "lower", "inner" and "outer" are used to describe features of the exemplary embodiments with reference to the positions of such features as displayed in the figures.

The foregoing descriptions of predetermined exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A coupled torsion beam axle for a vehicle including a torsion beam disposed in a vehicle width direction and trailing arms disposed at both ends of the torsion beam in a length direction of a vehicle body, wherein the torsion beam has:

an opened cross section formed in a reverse "U" shape by press-forming one sheet member machined; and cross section widths which are different from each other along vehicle width directions of both sides on the basis of the center between the trailing arms of both sides, and front and rear surfaces formed in a wave shape along the vehicle width directions of both sides on the basis of the center, and wherein the torsion beam includes:

a center part having a bent surface formed to be bent in a diagonal direction so that both sides of an upper end are symmetrical to each other at the center, and lower ends of both sides of the bent surface which are formed to be extended in a lower side direction;

side parts extended in both sides on the basis of the center part, having a cross section width which is increased as compared to a width of the center part, having both sides of an upper portion formed to be extended in a lower side, and a width of a lower portion which is increased as compared to that of the center part; and end parts extended in both sides on the basis of the side parts, having a cross section width which is decreased as compared to a width of the side parts, having both sides of an upper portion formed to be extended in a lower side, and a width of a lower portion which is decreased as compared to a width of the side parts.

2. The coupled torsion beam axle for the vehicle of claim 1, wherein the lower portion of the side parts is formed to be longer than a lower portion of the center part.

3. The coupled torsion beam axle for the vehicle of claim 2, wherein a lower end of the side parts is provided with a flange of which both ends are formed to be bent.

4. The coupled torsion beam axle for the vehicle of claim 1, wherein the lower portion of the end parts is formed to be shorter than the lower portion of the side parts.

5. The coupled torsion beam axle for the vehicle of claim 4, wherein a lower end of the end parts is provided with a flange of which both ends are formed to be bent.

* * * * *